United States Patent [19]

McGuire

[11] 3,999,887
[45] Dec. 28, 1976

[54] PROPELLER ASSEMBLY
[75] Inventor: Dennis P. McGuire, Erie, Pa.
[73] Assignee: Lord Corporation, Erie, Pa.
[22] Filed: July 9, 1975
[21] Appl. No.: 594,400
[52] U.S. Cl. ............................ 416/134 A; 416/141
[51] Int. Cl.² ........................................ B64C 11/12
[58] Field of Search .............. 416/134, 135, 134 A, 416/141, 245

[56] References Cited
UNITED STATES PATENTS

| 2,312,822 | 3/1943 | Julien et al. | 416/134 |
| 3,384,185 | 5/1968 | Fernandez | 416/134 A X |
| 3,470,962 | 10/1969 | Cure | 416/141 X |
| 3,669,566 | 6/1972 | Bourquardez et al. | 416/134 A |
| 3,762,834 | 10/1973 | Bourquardez et al. | 416/134 |
| 3,874,815 | 4/1975 | Baskin | 416/134 |
| 3,880,551 | 4/1975 | Kisovec | 416/134 |

FOREIGN PATENTS OR APPLICATIONS

| 759,185 | 1/1934 | France | 416/134 |
| 1,334,446 | 7/1963 | France | 416/134 |
| 759,535 | 1/1953 | Germany | 416/134 |
| 951,195 | 10/1956 | Germany | 416/134 |
| 498,224 | 1/1939 | United Kingdom | 416/134 |
| 1,190,259 | 4/1970 | United Kingdom | 416/134 A |

Primary Examiner—Everette A. Powell, Jr.
Attorney, Agent, or Firm—James W. Wright; Maurice R. Salada

[57] ABSTRACT

A propeller assembly comprises a rotatable drive shaft and two separate blade subassemblies resiliently coupled to and driven by the shaft. Each blade subassembly has a pair of interconnected propeller blades extending in opposite directions radially of the shaft. The blade subassemblies are disposed in parallel planes with the blades of one subassembly oriented transversely of the blades of the other subassembly. Rotational movement of the shaft is transmitted to the blade subassemblies through viscoelastic material which is torsionally loaded and stressed in shear. The viscoelastic material resiliently permits and damps in plane or lead-lag movement of each blade subassembly relative to the drive shaft. The subassemblies are also interconnected so that the viscoelastic material resiliently permits and damps relative in-plane movement between the subassemblies.

9 Claims, 6 Drawing Figures

PROPELLER ASSEMBLY

BACKGROUND OF THE INVENTION

In propeller assemblies for aircraft power plants, undesirable vibrations can be set up by various external forces and transmitted to the body or fuselage of the aircraft. In helicopters, for example, external aerodynamic forces can and do produce various motions of the rotor blades relative to the drive shaft, including lead-lag movements of the blades (i.e. oscillations of the blades in their plane of rotation relative to the rotor hub or drive shaft). Such movements represent a primary source of undesirable vibrations.

Proposals to reduce the generation and/or transmission of vibrations from aircraft propellers to aircraft fuselages have included: (a) specially designed blades; (b) articulating, rather than rigid, connections between propeller blades and their propeller hub; and (c) elastic connections between propeller hubs and their drive shafts. The use of articulating connections for individual blades has gained considerable favor, particularly in the helicopter industry. Early designs for individually articulated blades utilized pin-type hinge connectors to permit various motions of the blades, including in-plane or lead-lag movements, and also incorporated damping mechanisms to control the frequency and amplitude of such movements. One design, utilizing hinge-type connectors and friction-type damping mechanisms, is described and illustrated in Campbell U.S. Pat. No. 2,494,985. More recent designs utilize high capacity, laminated elastomeric bearings to provide the necessary articulation, as exemplified by the rotor system described and illustrated in Rybicki U.S. Pat. No. 3,782,854. The damping mechanisms may incorporate viscoelastic material, such as rubber, as exemplified by the mechanisms of Potter U.S. Pat. No. 3,758,230 and Potter U.S. Pat. No. 3,842,945.

In proposals for resiliently connecting a propeller hub to a drive shaft, the propeller blades are all connected to a hub and elastomeric material is interposed between the drive shaft and the hub. Such a propeller assembly is described and illustrated in Julien et al U.S. Pat. No. 2,312,822. In the propeller assembly illustrated in FIG. 12 of the Julien et al patent, for example, a metal plate is secured to an end of the drive shaft in a plane that is generally perpendicular to the shaft. A second metal plate is secured to the propeller hub parallel to and spaced axially from the first plate. A body of elastomer is interposed between the plates and bonded to both plates. Rotational movement of the drive shaft is transmitted to the blades through the elastomer. While the opposed blades of the Julien propeller are essentially rigidly interconnected, a pair of opposed propeller blades may be flexibly interconnected using an intermediate flexible strap, as suggested for helicopter rotors in Mautz U.S. Pat. No. 3,578,877 and Baskin U.S. Pat. No. 3,874,815.

Inherent with the lead-lag movement of rotor blades are scissor-like or "scissors mode" movements between adjacent blades. To a large extent, "scissors mode" motions in rotors having individually articulated blades can be controlled by lead-lag dampers for the individual blades. In rotors utilizing pairs of interconnected blades, where "scissors mode" movements occur between the blades of different blade pairs, this inventor is not aware of any specific proposals to control such movements. Both lead-lag and "scissors mode" movements are more pronounced and more likely to occur in helicopter rotors, where the air flow to the blades is generally radial, than in propellers for fixed wing aircraft, for example.

SUMMARY OF THE INVENTION

According to the invention, a propeller assembly comprises a rotatable drive shaft and two separate blade subassemblies resiliently coupled to the shaft for rotation with the shaft. Each blade subassembly includes a pair of interconnected propeller blades extending in opposite directions radially of the drive shaft. The two subassemblies are disposed in generally parallel planes with the blades of each subassembly oriented transversely of the blades of the other subassembly. Rotational movement of the shaft is transmitted to the blades through viscoelastic material which is loaded torsionally and stressed in shear. The viscoelastic material resiliently permits and damps in-plane or lead-lag movement of the blade subassembly relative to the drive shaft. The blade subassemblies are also interconnected so that the viscoelastic material resiliently permits and damps relative in-plane movement between the blade subassemblies.

In one embodiment of the invention, each blade subassembly is connected to the drive shaft by at least one coupling device that includes a body of viscoelastic material. A first rigid support or cover plate carried by one of the blade subassemblies intermediate the outboard ends of the subassembly blades is bonded to one surface of the viscoelastic body. A second rigid support or cover plate disposed in parallel and spaced relation to the first plate is bonded to a second surface of the viscoelastic body. The second plate is attached to the drive shaft with rotational movement of the shaft being imparted or transmitted to the blade subassembly by torsional loading of the viscoelastic body.

A pair of coupling devices are preferably employed for each blade subassembly in order to provide symmetry and facilitate the attainment of other advantages. The coupling devices for each blade subassembly are disposed on opposite sides of the subassembly with proximate cover plates attached to the subassembly and remote cover plates interconnected to each other and the drive shaft. More specifically, a central portion of the blade subassembly extends between and is attached to the proximate cover plates. Means including spacer elements interconnect the remote cover plates independently of the viscoelastic bodies and the proximate cover plates. The spacer elements maintain the remote cover plates at a fixed distance apart, the distance being predetermined to insure limited precompression of the viscoelastic body of each coupling device upon assembly.

The viscoelastic body of each coupling device may be formed in a layer or layers of uniform thickness. Alternatively, to achieve uniform shear strain in torsion across the body of viscoelastic material, the viscoelastic body may be formed in a layer or layers having a thickness that increases in a direction radially outwardly of the axis about which the corresponding blade subassembly rotates.

BRIEF DESCRIPTION OF THE DRAWINGS

For a better understanding of the invention, reference may be made to the following description of an exemplary embodiment, taken in conjunction with the figures of the accompanying drawings, in which.

DESCRIPTION OF PREFERRED EMBODIMENT

Figure 1:
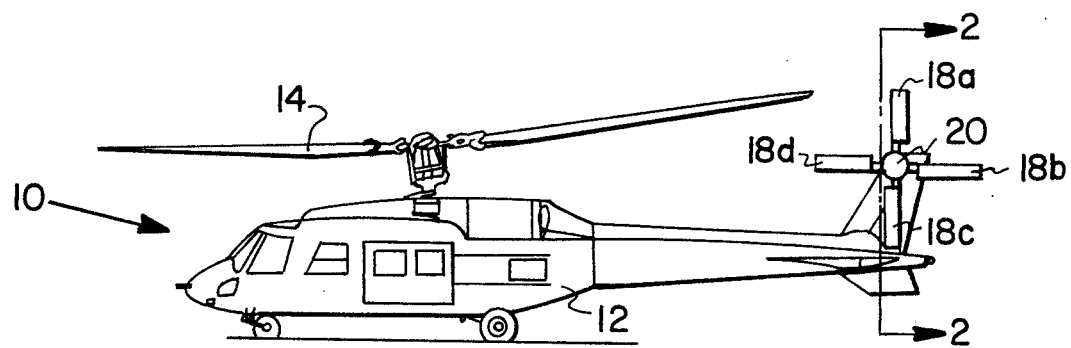
FIG. 1 is a side view of a helicopter utilizing a propeller assembly according to the present invention.

FIG. 1 of the drawings illustrates a helicopter, generally designated 10, having an elongated fuselage or hull 12 and a main rotor or propeller assembly 14 to supply the primary forces for flight of the helicopter. Mounted on the tail portion of the helicopter 10 as an anti-torque tail rotor or propeller assembly 16, which is constructed according to the present invention and is employed in conjunction with the main propeller assembly to provide in-flight stability.

The tail rotor 16 includes four individual rotor blades 18 a–d mounted on and extending radially of a drive shaft 20. The blades 18 a–d are disposed in parallel planes normal to the drive shaft 20 with the blades being spaced at about 90° intervals about the shaft 20. Diametrically opposed blades 18a and c and 18b and d, respectively, are disposed in the same plane and define a pair of separate blade subassemblies.

Figure 2:
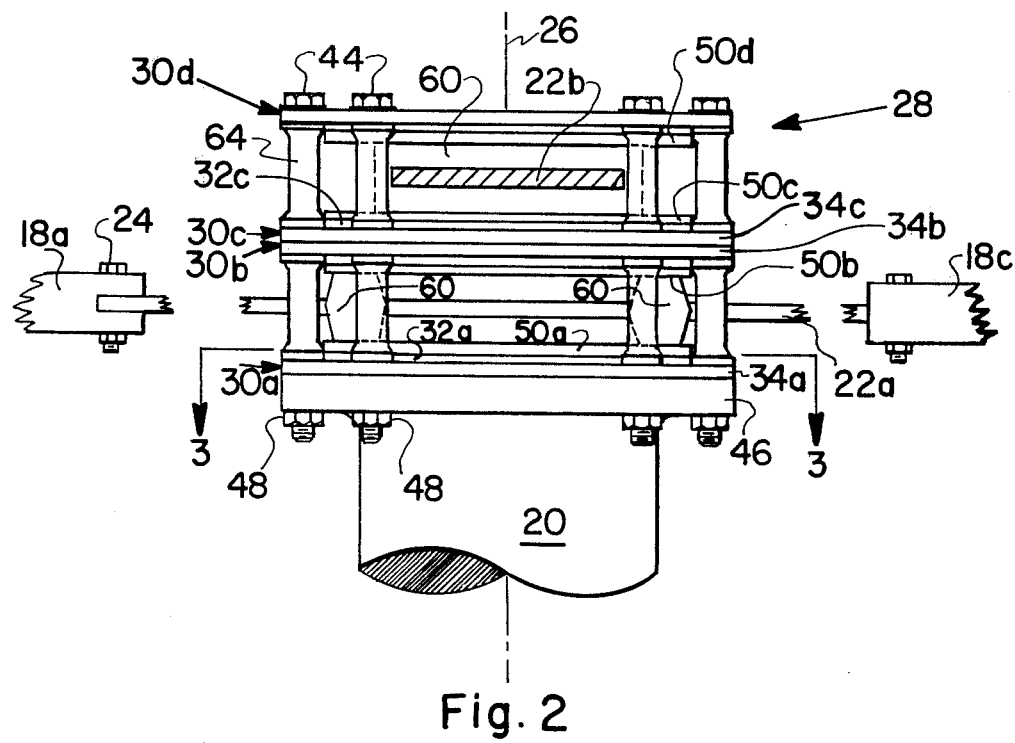
FIG. 2 is a view of the propeller assembly of FIG. 1 taken along line 2—2 of FIG. 1.

With reference to FIG. 2, the inboard ends of diametrically opposed rotor blades 18a and c and 18b and d are interconnected by intermediate flexible straps 22a and b, respectively. The blades 18 a–d are secured to the straps 22a and b by conventional means, such as nut-and-bolt fasteners 24. The flexible straps 22a and b may be fabricated of fiber glass or other flexible material which can accommodate flapping motion of the blades 18 a–d and changes in the pitch of the blades, while being substantially rigid in the plane of rotation of the blades. The flapping motions of the blades 18 a–d are accommodated by bending of the flexible straps 22a and b in directions parallel to the longitudinal axis of the rotatable drive shaft 20. Changes in pitch of the blades 18 a–d are accommodated by twisting of the flexible straps 22a and b about the longitudinal axes of the blades. Two pivot blocks 60 are located at spaced intervals along the flexible straps 22a and b. The pivot blocks 60 facilitate flexing of the straps 22a and b, as heretofore mentioned, while providing a connection between the blades and other portions of the tail rotor 16. A typical construction for the pivot blocks 60 is described and illustrated in Baskin U.S. Pat. No. 3,874,815.

The rotatable drive shaft 20 is rotated about its longitudinal axis 26 by a conventional helicopter power plant (not shown) from which power and movement are transmitted by a convention drive train (not shown). The drive shaft 20 terminates with a circular flange 46 to which the two blade subassemblies are attached. A connecting assembly, generally designated 28, in accordance with the present invention, connects the blade subassemblies to each other and to the flange 46 of drive shaft 20. The connecting assembly 28 includes four identical coupling devices 30 a–d. Two coupling devices 30a and b are associated with the blade subassembly comprising interconnected blades 18a and c. The other two coupling devices 30c and d are associated with the blade subassembly comprising interconnected rotor blades 18b and d.

Figures 4, 5, 6:
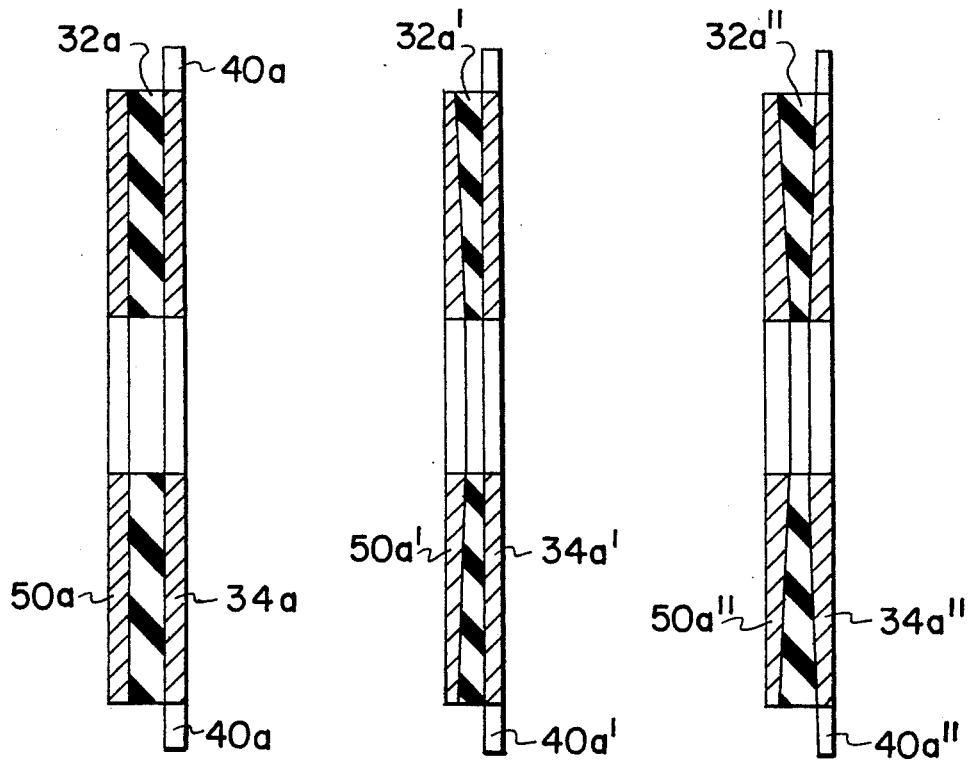
FIG. 4 is a sectional view of a portion of the propeller assembly of FIG. 2 taken along line 4—4 of FIG. 3.
FIG. 5 is a view corresponding to FIG. 4 of a modified form of the invention.
FIG. 6 is a view corresponding to FIG. 4 of another form of the invention.

Inasmuch as each of the coupling devices 30a–d is of identical construction, the construction of the devices will be explained with particular reference only to coupling device 30a. Corresponding components of each coupling device are designated in the figures of the drawings with corresponding reference numerals. As best seen in FIGS. 2 and 4, coupling device 30a includes an annular layer or body 32a of a viscoelastic material, such as natural rubber. As its name implies, the viscoelastic material possesses the capabilities of storing energy and of dissipating energy. Particular viscoelastic materials suitable for use in the present invention should be solid rather than liquid and may include, in addition to natural rubber, silicone rubbers, urethane rubbers, nitrile rubbers, plasticized polyvinyl acetates, polystyrenes, polyisobutylenes, polyvinyl chlorides and polymethyl methacrylates. For a detailed treatment of viscoelastic materials and their mode of operation, reference may be made to an article by Eric E. Ungar and D. Kent Hatch, entitled "High Damping Materials", which appeared in the periodical "Product Engineering", Volume 32, Number 16, dated April 17, 1961.

Figure 3:
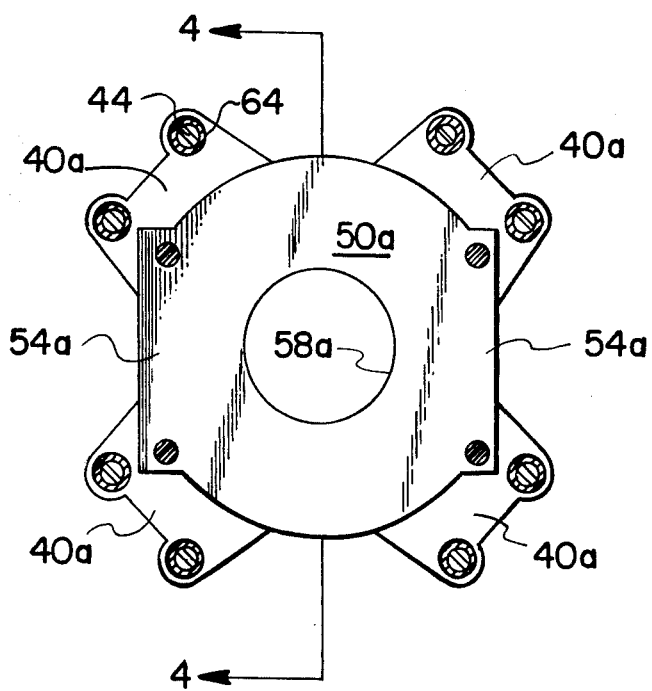
FIG. 3 is a sectional plan view taken along line 3—3 of FIG. 2.

Rigid annular support or cover plates 34a and 50a, disposed parallel to each other, are bonded to opposite surfaces of the layer 32a of viscoelastic material. The plates 34a and 50a may be fabricated of steel or other rigid materials, such as other metals, sheets of fiber glass and reinforced plastic. As shown in FIG. 3, the plate 34a includes four radially extending tabs 40a equally spaced about the circumference of the plate. Each of the tabs 40a has two spaced apertures or bolt holes which are employed in assembly. Plate 50a includes a pair of diametrically opposed tabs 54a. Each of the tabs 54a has two spaced apertures or openings that receive screws for connecting the plate 50a to the pivot blocks 60.

As shown in FIG. 2, coupling devices are disposed on opposite sides of each blade subassembly. Thus, cover plate 50a is proximate to cover plate 50b and cover plate 50c is proximate to cover plate 50d. The cover plates 50 a–d are assembled to the pivot blocks 60 by screws disposed through the openings in the tabs 54 a–d and screwed into corresponding pivot blocks. With the blade subassemblies oriented at 90° relative to each other, the coupling devices 30 a–d are stacked upon each other with the tabs 40 a–d of the cover plates 34 a–d aligned. Hollow spools or spacers 64 of predetermined length are disposed between tabs 40 a and b of cover plates 34a and b and tabs 40 c and d of cover plates 34c and d. The openings through the spools or spacers 64 are aligned with the bolt holes in the tabs 40 a–d. Bolts 44 are passed through aligned holes in cover plates 34 a–d intermediate spacers 64, and flange 46. Nuts 48 are received on bolts 44, locking the cover plates 34 a–d in a fixed position relative to shaft 20. The spacers 64 are of a uniform length typically chosen to be slightly less in length than the normal spacing between cover plates 34a and b and 34c and d so that the layers of viscoelastic material will be precompressed uniformly a predetermined amount upon tightening of nuts 48.

As described above, coupling devices 30 a–d, including layers 32 a–d of viscoelastic material, are disposed normal to the axis 26 of rotation of drive shaft 20 and thus parallel to the planes of rotation of the blade subassemblies. In addition, the annular components, layers 32 a–d of viscoelastic material and cover plates 34 a–d and 50 a–d, are disposed concentric to the axis 26.

In operation, rotational movement is transmitted from the drive shaft 20 to the rotor blades 18 a–d. In particular, the rotary motion is transmitted from the flange 46 of the drive shaft 20 through the bolts 44 into the cover plates 34 a–d of the various coupling devices 30 a–d. Rotational movement of the plates 34 a–d is transmitted through the layers 32 a–d of viscoelastic material to the cover plates 50 a–d, the viscoelastic bodies being loaded in torsion and stressed in shear to transmit the rotational movement. Movement of the plates 50 a–d is, in turn, transmitted through the pivot blocks 60 to the flexible straps 22a and b and, thus, to the rotor blades 18 a–d. The coupling devices 30 a–d resiliently permit and damp oscillations of the blade subassemblies relative to the drive shaft 20 and to each other in the plane of rotation of the rotor blades. Thus, the so-called "scissors mode" motions of the blade subassemblies relative to each other are accommodated through the shearing action of the viscoelastic bodies 32. By proper selection of the material for the layers 32 a–d of viscoelastic material, the frequency of the "scissors mode" motion can be adjusted and the amplitude of such motions may be reduced through the damping characteristics of the viscoelastic material. Accordingly, greater design flexibility is provided to avoid any instability of the rotor system resulting from "scissors mode" motions between the blade subassemblies. As suggested previously, "scissors mode" instability is more likely to be a problem in helicopter rotors, where the air flow to the blades is generally radial, than in propellers for fixed wing aircraft, for example, where the air flow is generally axial to the propeller. The structure of the tail rotor 16 and the coupling devices 30 a–d also permits the "scissors mode" motions to be controlled without interferring with other motions of the blades.

As exemplified by FIG. 4 (in which the relative thicknesses of the components have been exaggerated for clarity of illustration), the layers 32 a–d of viscoelastic material are of uniform thickness. Nonetheless, utilization of layers of viscoelastic material of uniform thickness results in a shear-strain gradient from the radially innermost portion of the viscoelastic body to the radially outer periphery of the body. A uniform shear strain and, consequently, a more efficient utilization of the viscoelastic material can be achieved by increasing the thickness of the viscoelastic layer in a direction radially outwardly of the axis about which the blades 18 a–d rotate, as shown in FIGS. 5 and 6. A tapered layer of viscoelastic material requires either one or both of the corresponding cover plates to be similarly tapered, as shown in FIGS. 5 (cover plate 50a') and 6 (cover plates 34a'' and 50a''), respectively, which increases production costs somewhat. (The beneficial results of such tapering of an elastomeric body have previously been recognized, as shown by Anderson, Jr. U.S. Pat. No. 2,207,496). Providing the central openings in the viscoelastic layers 32 a–d eliminates material that is not highly stressed and, therefore, not utilized effectively. Rather than employ a single layer of viscoelastic material within a coupling device, a laminated construction including a plurality of layers of viscoelastic material may be employed.

It will be understood that the embodiment described above is merely exemplary and that persons skilled in the art may make many variations and modifications without departing from the spirit and scope of the invention. All such modifications and variations are intended to be within the scope of the invention as defined in the appended claims.

What is claimed is:
1. A propeller assembly comprising:
   a. a rotatable drive shaft;
   b. two separate blade subassemblies, each of which includes a pair of propeller blades extending in opposite directions radially of said drive shaft, an inboard end of each blade of each blade subassembly being connected to an adjacent end of the other blade of said subassembly, the blades of one subassembly being oriented transversely of the blades of the other subassembly and the two blade subassemblies being disposed in generally parallel planes; and
   c. means resiliently connecting the blade subassemblies to each other and to the drive shaft for rotation with the shaft, said connecting means including viscoelastic means through which rotational movement of the shaft is transmitted to the blades, the viscoelastic means being loaded torsionally and stressed in shear to transmit said rotational movement while resiliently permitting and damping in-plane movements of the blade subassemblies relative to the drive shaft, the viscoelastic means also resiliently permitting and damping relative in-plane oscillations between the blade subassemblies.
2. A propeller assembly comprising:
   a. a rotatable drive shaft;
   b. two separate blade subassemblies, each of which includes a pair of propeller blades extending in opposite directions radially of said drive shaft, an inboard end of each blade of each blade subassembly being connected to an adjacent end of the other blade of said subassembly, the blades of one subassembly being oriented transversely of the blades of the other subassembly and the two blade subassemblies being disposed in generally parallel planes; and
   c. means resiliently connecting the blade subassemblies to each other and to the drive shaft for rotation with the shaft, said connecting means including for each blade subassembly at least one coupling device comprising
      i. a layer of viscoelastic material,
      ii. a first cover plate bonded to a first surface of the layer of viscoelastic material and attached to a corresponding blade subassembly intermediate the outboard ends of the blades, and
      iii. a second cover plate bonded to a second surface of the layer of viscoelastic material and attached to the drive shaft, said layer of viscoelastic material being disposed normal to the axis of rotation of said shaft and parallel to the plane of rotation of said corresponding blade subassembly, the viscoelastic layer being loaded torsionally and stressed in shear in response to rotation of the drive shaft to transmit rotational movement while resiliently permitting and damping in-plane movement of said corresponding blade subassembly relative to the drive shaft, the coupling device for each blade subassembly being connected to a coupling device for the other blade subassembly and their respective layers of viscoelastic material resiliently permitting and damping relative in-plane oscillations between said blade subassemblies.

3. A propeller assembly, according to claim 2, wherein the connecting means includes a coupling device disposed on each of two opposed sides of each blade subasssembly intermediate the outboard ends of the blades, said coupling devices being in stacked relation to each other and proximate cover plates on opposite sides of a blade subassembly being attached to that blade subassembly, and wherein the connecting means also includes means interconnecting remote cover plates on opposite sides of a blade subassembly independently of the layers of viscoelastic material and proximate cover plates between said remote cover plates, said interconnecting means also attaching said remote cover plates to the drive shaft.

4. A propeller assembly, according to claim 3, wherein said means interconnecting remote cover plates precompresses the layers of viscoelastic material between the cover plates of each coupling device.

5. A propeller assembly, according to claim 4, wherein said connecting means also includes spacer means interposed between said remote cover plates at spaced locations and cooperating with said remote cover plate interconnecting means for limiting and insuring uniform precompression of the layers of viscoelastic material.

6. A propeller assembly, according to claim 3, wherein each layer of viscoelastic material is of uniform thickness.

7. A propeller assembly, according to claim 3, wherein each layer of viscoelastic material has a thickness that increases in a direction radially outwardly of a common axis about which the blade subassemblies rotate.

8. A propeller assembly, according to claim 3, wherein each layer of viscoelastic material is annular and concentric relative to a common axis about which the blade subassemblies rotate.

9. A propeller assembly, according to claim 3, wherein each blade subassembly also includes a fleixble strap disposed between adjacent inboard ends of the propeller blades and secured to each of said adjacent ends, the proximate cover plates of the associated coupling devices being attached to the flexible strap.

* * * * *